(12) United States Patent
Kagawa et al.

(10) Patent No.: US 10,902,877 B2
(45) Date of Patent: Jan. 26, 2021

(54) RECORDING AND REPRODUCING DEVICE AND RECORDING AND REPRODUCING METHOD

(71) Applicant: FUJIFILM CORPORATION, Tokyo (JP)

(72) Inventors: Yusuke Kagawa, Kanagawa (JP); Tetsuya Kaneko, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/812,374

(22) Filed: Mar. 9, 2020

(65) Prior Publication Data

US 2020/0312366 A1    Oct. 1, 2020

(30) Foreign Application Priority Data

Mar. 25, 2019   (JP) .................. 2019-057409

(51) Int. Cl.
| | | |
|---|---|---|
| *G11B 27/36* | (2006.01) | |
| *G11B 15/087* | (2006.01) | |
| *G11B 5/008* | (2006.01) | |
| *G11B 33/04* | (2006.01) | |

(52) U.S. Cl.
CPC ........ *G11B 15/087* (2013.01); *G11B 5/00813* (2013.01); *G11B 33/04* (2013.01)

(58) Field of Classification Search
CPC ......... G11B 27/36; G11B 15/46; G11B 5/012; G11B 5/09; G11B 5/59677; G11B 5/71; G11B 5/00813; G11B 5/5508; G11B 5/5926; G11B 5/4813; G11B 5/584; G11B 5/0086; G11B 20/1833; G11B 5/00878; G11B 2020/1275; G11B 5/41; G11B 20/1211

USPC ................ 360/25, 31, 53, 64, 75, 99.06

See application file for complete search history.

(56) References Cited

U.S. PATENT DOCUMENTS

2006/0061898 A1 * 3/2006 Nakao .................. G11B 5/584
                                                                    360/31

FOREIGN PATENT DOCUMENTS

| JP | H02-81349 A | 3/1990 |
|---|---|---|
| JP | 2004-318983 A | 11/2004 |
| JP | 2010-231843 A | 10/2010 |

(Continued)

*Primary Examiner* — Nabil Z Hindi
(74) *Attorney, Agent, or Firm* — Solaris Intellectual Property Group, PLLC

(57) ABSTRACT

A recording and reproducing device includes: a first acquisition unit which acquires servo band interval information representing an interval, in a width direction of a magnetic tape, between adjacent servo recording elements of plural servo recording elements which record the servo patterns on the plural servo bands, respectively; a second acquisition unit which acquires reproducing element interval information representing an interval in the width direction between respective servo reproducing elements which read the adjacent servo patterns along the width direction with respect to the plural tape drives; and a selection unit which selects a tape drive into which the magnetic tape is inserted, from the plural tape drives, using a value representing a difference between the interval represented by the servo band interval information and the interval represented by the reproducing element interval information.

7 Claims, 13 Drawing Sheets

(56) References Cited

FOREIGN PATENT DOCUMENTS

JP 2012-053940 A 3/2012

* cited by examiner

IDEAL SERVO
PATTERN

ACTUAL SERVO
PATTERN

SP1 SP2
　　SP

SP1 SP2
　　SP

RECORDING AND REPRODUCING DEVICE AND RECORDING AND REPRODUCING METHOD

CROSS-REFERENCE TO RELATED APPLICATION

This application claims priority from Japanese Patent Application No. 2019-057409, filed Mar. 25, 2019, the disclosure of which is incorporated herein by reference in its entirety.

BACKGROUND

Technical Field

The present disclosure relates to a recording and reproducing device, a recording and reproducing method, and a non-transitory storage medium.

Related Art

JP1990-081349A (JP-H2-081349A) discloses a technology of selecting one tape drive from a candidate tape drive group, in a case of writing data on a magnetic tape. In this technology, a tape drive having a minimum movement distance of an accessor robot which extracts a magnetic tape from a slot containing the magnetic tape and moves the magnetic tape to a tape drive is selected from the candidate tape drive group.

However, in recent years, realization of high-density of a magnetic tape has proceeded, and accordingly, a width of a data track and intervals between the data tracks become extremely narrow. In the future, it is expected that realization of the high density of the magnetic tape further proceeds, and therefore, a higher accuracy is required for positioning of a magnetic head of the magnetic tape in the width direction.

Meanwhile, a servo recording head including a plurality of servo recording elements which are provided to correspond to a plurality of servo bands in a one-to-one manner and record servo patterns, respectively, may be individually different due to errors or the like in a manufacturing process. In addition, servo reproducing element of the magnetic head included in the tape drive may also be individually different due to errors or the like in a manufacturing process.

In this case, in a case where the tape drive is selected, without considering these individual differences, a difference between an interval between servo patterns recorded on the magnetic tape along a width direction of the magnetic tape, and an interval between reproducing elements which reproduce the servo patterns along the width direction may comparatively increase. In this case, in a case where the positioning of a magnetic head is performed based on the servo patterns recorded on the servo bands, the positioning of the magnetic head may not be performed with an excellent accuracy. However, JP1990-081349A (JP-H2-081349A) does not disclose a technology of selecting the tape drive by considering the accuracy of the positioning of the magnetic head.

SUMMARY

This disclosure is made in consideration of these circumstances and an object thereof is to provide a recording and reproducing device, a recording and reproducing method, and a non-transitory storage medium capable of performing positioning of a magnetic head with an excellent accuracy.

In this disclosure, there is provided a recording and reproducing device for selecting a tape drive into which a magnetic tape is inserted, from a plurality of drives, the magnetic tape including a plurality of servo bands, on which servo patterns are recorded, and data bands which are provided between the servo bands and on which data is recorded, the device comprising: a first acquisition unit which acquires servo band interval information representing an interval, in a width direction of the magnetic tape, between adjacent servo recording elements of a plurality of servo recording elements which record the servo patterns on the plurality of servo bands, respectively; a second acquisition unit which acquires reproducing element interval information representing an interval in the width direction between respective servo reproducing elements which read the adjacent servo patterns along the width direction with respect to the plurality of tape drives; and a selection unit which selects a tape drive into which the magnetic tape is inserted, from the plurality of tape drives, using a value representing a difference between the interval represented by the servo band interval information and the interval represented by the reproducing element interval information.

In the recording and reproducing device of this disclosure, the selection unit may select a tape drive having a minimum value of representing the difference, from the plurality of tape drives.

In the recording and reproducing device of this disclosure, the recording and reproducing device further comprises: a third acquisition unit which acquires an environment temperature in a tape library having the plurality of embedded tape drives, and the value representing the difference may be a value representing the difference between the interval represented by the servo band interval information, and a value obtained by multiplying a coefficient which increasing as the environment temperature increases, by the interval represented by the reproducing element interval information.

In the recording and reproducing device of this disclosure, the second acquisition unit may acquire the reproducing element interval information stored in a storage unit included in the tape drive.

In the recording and reproducing device of this disclosure, the second acquisition unit may acquire the reproducing element interval information sent by the tape drive, in a case where the tape drive is mounted in the tape library.

In this disclosure, there is provided a recording and reproducing method of a magnetic tape including a plurality of servo bands, on which servo patterns are recorded, and data bands which are provided between the servo bands and on which data is recorded, the method comprising: acquiring servo band interval information representing an interval, in a width direction of the magnetic tape, between adjacent servo recording elements of a plurality of servo recording elements which record the servo patterns on the plurality of servo bands, respectively; acquiring reproducing element interval information representing an interval in the width direction between respective servo reproducing elements which read the adjacent servo patterns along the width direction, with respect to the plurality of tape drives; and selecting, from the plurality of tape drives of a recording and reproducing device, a tape drive into which the magnetic tape is inserted, using a value representing a difference between the interval represented by the servo band interval information and the interval represented by the reproducing element interval information.

In this disclosure, there is also provided a non-transitory storage medium storing a program that causes a computer to execute a recording and reproducing processing of a magnetic tape including a plurality of servo bands, on which servo patterns are recorded, and data bands which are provided between the servo bands and on which data is recorded, the recording and reproducing processing including: acquiring servo band interval information representing an interval, in a width direction of the magnetic tape, between adjacent servo recording elements of a plurality of servo recording elements which record the servo patterns on the plurality of servo bands, respectively; acquiring reproducing element interval information representing an interval in the width direction between respective servo reproducing elements which read the adjacent servo patterns along the width direction with respect to the plurality of tape drives; and selecting, from a plurality of tape drives of a recording and reproducing device, a tape drive into which the magnetic tape is inserted, using a value representing a difference between the interval represented by the servo band interval information and the interval represented by the reproducing element interval information.

According to this disclosure, it is possible to perform the positioning of a magnetic head with an excellent accuracy.

DETAILED DESCRIPTION

Figure 1:
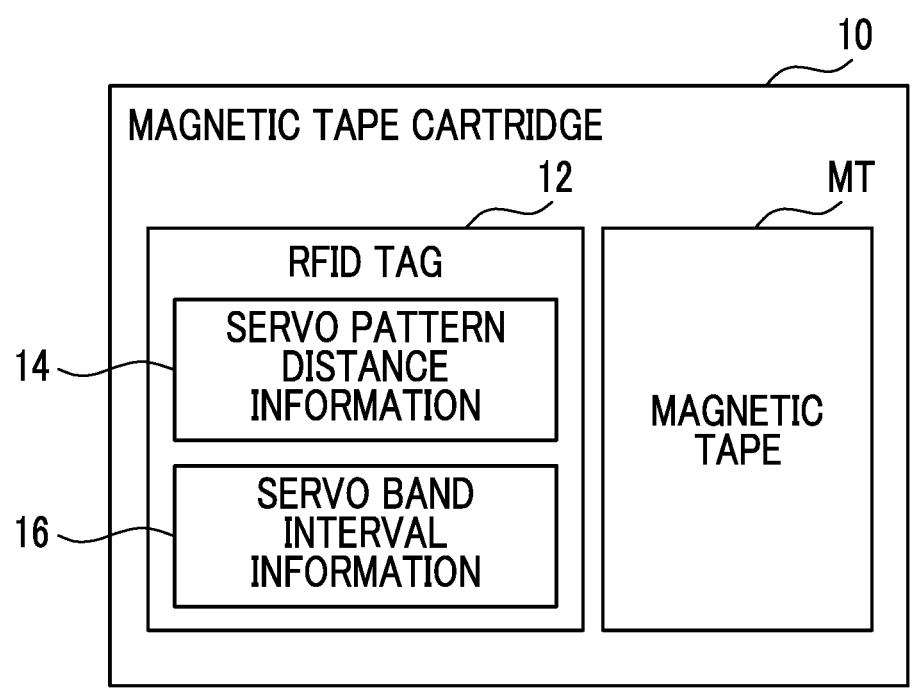
FIG. 1 is a block diagram showing an example of a configuration of a magnetic tape cartridge according to an embodiment.

Hereinafter, examples for executing a technology of this disclosure with reference to the drawings.

First, before describing the details of the embodiment, servo patterns used in the embodiment will be described.

For various steps for manufacturing a magnetic tape, a description disclosed in paragraphs 0067 to 0070 of JP2010-231843A can be referred to. A servo pattern can be formed on the magnetic tape by a well-known method, in order to realize tracking control of a magnetic head of the magnetic tape device and control of a running speed of the magnetic tape. The "formation of the servo pattern" can be "recording of a servo signal". The servo signal is generally recorded along a longitudinal direction of the magnetic tape. As a method of control using a servo signal, timing-based servo, amplitude servo, or frequency servo is used. Hereinafter, the recording of the servo signal will be further described.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo signal is configured by continuously disposing a plurality of pairs of magnetic stripes (also referred to as "servo stripes") not parallel to each other in a longitudinal direction of the magnetic tape. As described above, a reason for that the servo signal is configured with one pair of magnetic stripes not parallel to each other is because a servo reproducing element passing on the servo signal recognizes a passage position thereof. Specifically, one pair of the magnetic stripes are formed so that a interval thereof is continuously changed along the width direction of the magnetic tape, and a relative position of the servo signal and the servo reproducing element can be recognized, by the reading of the interval thereof by the servo reproducing element. The information of this relative position can realize the tracking of a data track. Accordingly, a plurality of servo tracks are generally set on the servo signal along the width direction of the magnetic tape.

The servo band is configured of a servo signal continuous in the longitudinal direction of the magnetic tape. A plurality of servo bands are normally provided on the magnetic tape. For example, the number of servo bands is 5 in the LTO tape. A region interposed between two adjacent servo bands is called a data band. The data band is configured of a plurality of data tracks and each data track corresponds to each servo track.

In one aspect, as shown in JP2004-318983A, information representing the number of servo band (also referred to as "servo band identification (ID)" or "UDIM information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo reproducing element.

In a method of uniquely specifying the servo band, a staggered method as shown in ECMA-319 is used. In this staggered method, the groups of one pair of magnetic stripes not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo signal by two servo reproducing elements.

In addition, as shown in ECMA-319, information representing the position in the longitudinal direction of the magnetic tape (also referred to as "LPOS information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information. In addition, as a method of embedding the information in the servo band, a method other than the method described above can be used. For example, a predetermined code may be recorded by thinning out a predetermined pair among the group of pairs of the servo stripes.

A servo signal recording head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of recording the servo signal, by inputting a current pulse while causing the magnetic tape to run on the servo write head, the magnetic pattern corresponding to the pair of gaps is transferred to the magnetic tape, and the servo signal can be recorded. A width of each gap can be suitably set in accordance with a density of the servo signals to be recorded. The width of each gap can be set as, for example, equal to or smaller than 1 μm, 1 to 10 μm, or equal to or greater than 10 m.

Before recording the servo signal on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo signal to be recorded is determined in accordance with the direction of erasing. For example, in a case where the horizontal DC erasing is performed to the magnetic tape, the recording of the servo signal is performed so that the direction of the magnetic field and the direction of erasing become opposite to each other. Accordingly, the output in a case of reading the servo signal can be increased. As disclosed in JP2012-053940A, in a case where the pattern is transferred to the magnetic tape subjected to the vertical DC erasing by using the gap, the reading signal of the recorded servo signal has a unipolar pulse shape. Meanwhile, in a case where the pattern is transferred to the magnetic tape subjected to the horizontal DC erasing by using the gap, the reading signal of the recorded servo signal has a bipolar pulse shape.

The magnetic head which performs at least one of the recording of data or the reproducing of data may include the servo reproducing element. Alternatively, as a head other than the magnetic head which performs at least one of the recording of data or the reproducing of data, the magnetic head including the servo reproducing element may be included in the magnetic tape device. For example, the magnetic head can include two servo reproducing elements, and each of the two servo reproducing elements can read two adjacent servo bands at the same time. One or a plurality of elements for data can be disposed between the two servo reproducing elements.

Next, a configuration of a magnetic tape cartridge 10 according to the embodiment will be described with reference to FIGS. 1 and 2. As shown in FIG. 1, a magnetic tape cartridge 10 includes a magnetic tape MT on which information is magnetically recorded, and a radio frequency identifier (RFID) tag 12 as an example of a recording medium capable of reading the recorded information by wireless communication or the like in a contactless manner. On the RFID tag 12, a servo pattern distance information 14 and a servo band interval information 16 are recorded. Details of the servo pattern distance information 14 and the servo band interval information 16 will be described later. As an example of the magnetic tape MT, an LTO tape is used.

Figure 2:
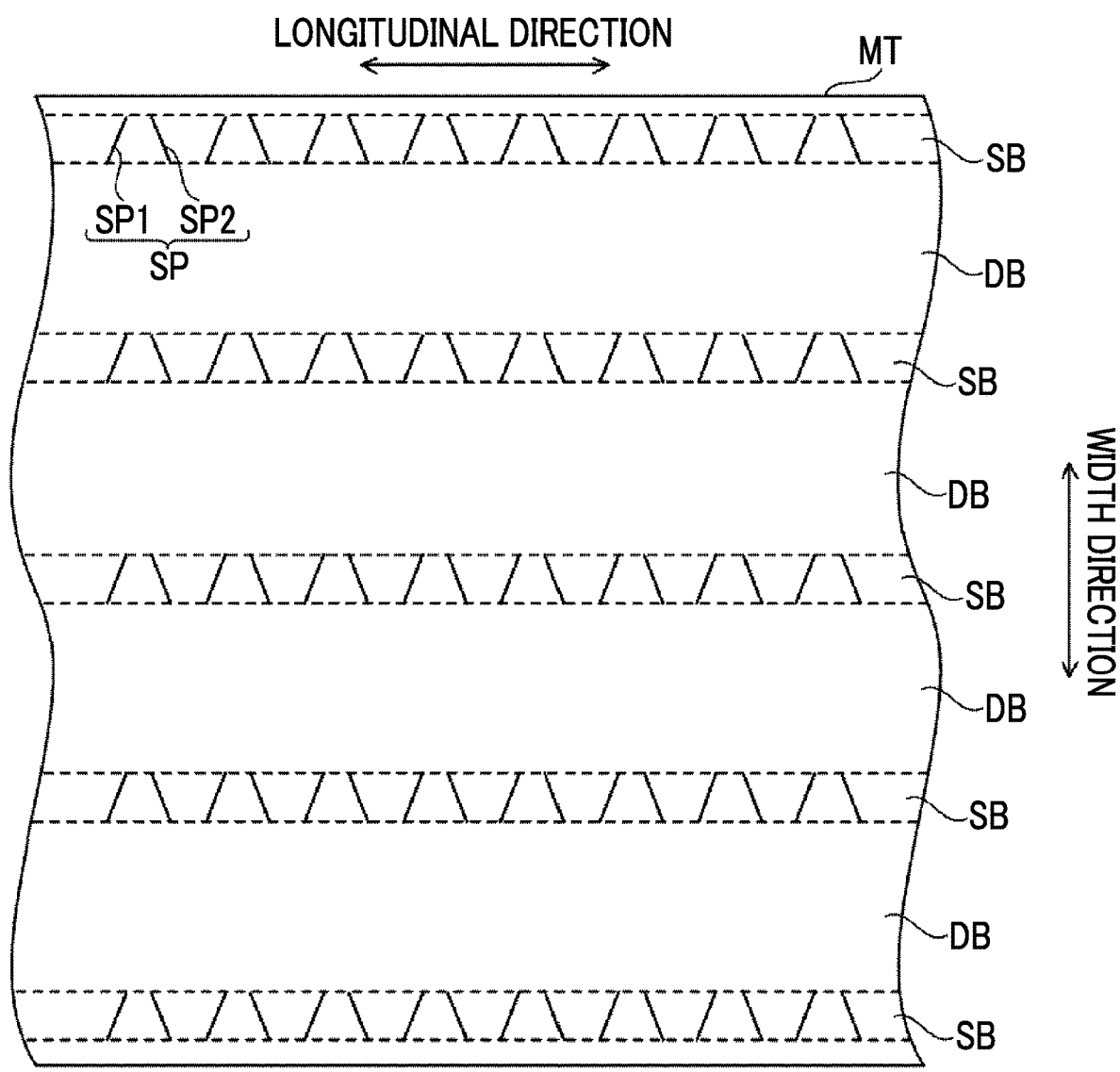
FIG. 2 is a plan view showing an example of a magnetic tape according to the embodiment.

As shown in FIG. 2, five servo bands SB are formed on the magnetic tape MT along a longitudinal direction of the magnetic tape MT. The five servo bands SB are formed so as to be arranged in a width direction (short direction) of the magnetic tape MT at regular intervals. A data band DB, on which data is recorded, is formed between each of the five servo bands SB. The number of the servo bands SB and the data bands DB is not limited to the example shown in FIG. 2. For example, the number of servo bands SB may be 3 and the number of data bands DB may be 2. Hereinafter, the longitudinal direction of the magnetic tape MT is referred to as a "tape longitudinal direction", and the width direction of the magnetic tape MT is referred to as a "tape width direction".

On the servo band SB, servo patterns SP for performing the positioning of a magnetic head H (see FIG. 3) in the tape width direction are repeatedly formed in the tape longitudinal direction. The servo pattern SP includes a linear pattern SP1 and a linear pattern SP2 which are formed along the tape width direction to be tilted with respect to the tape width direction by a predetermined angle. The linear pattern SP2 is formed not to be parallel with the linear pattern SP1 along the tape width direction. In the embodiment, the linear pattern SP2 is formed so as to be linearly symmetrical to the linear pattern SP1, with respect to the linear line along the tape width direction. FIG. 2 shows an example in which the servo pattern SP includes one pair of the linear pattern SP1 and the linear pattern SP2, but the servo pattern SP may include a plurality of sets of linear pattern SP1 and the linear pattern SP2.

Next, a process of positioning the magnetic head H with respect to the tape width direction of the magnetic tape MT on which the servo pattern SP is formed will be described with reference to FIGS. 3 and 4.

Figure 3:
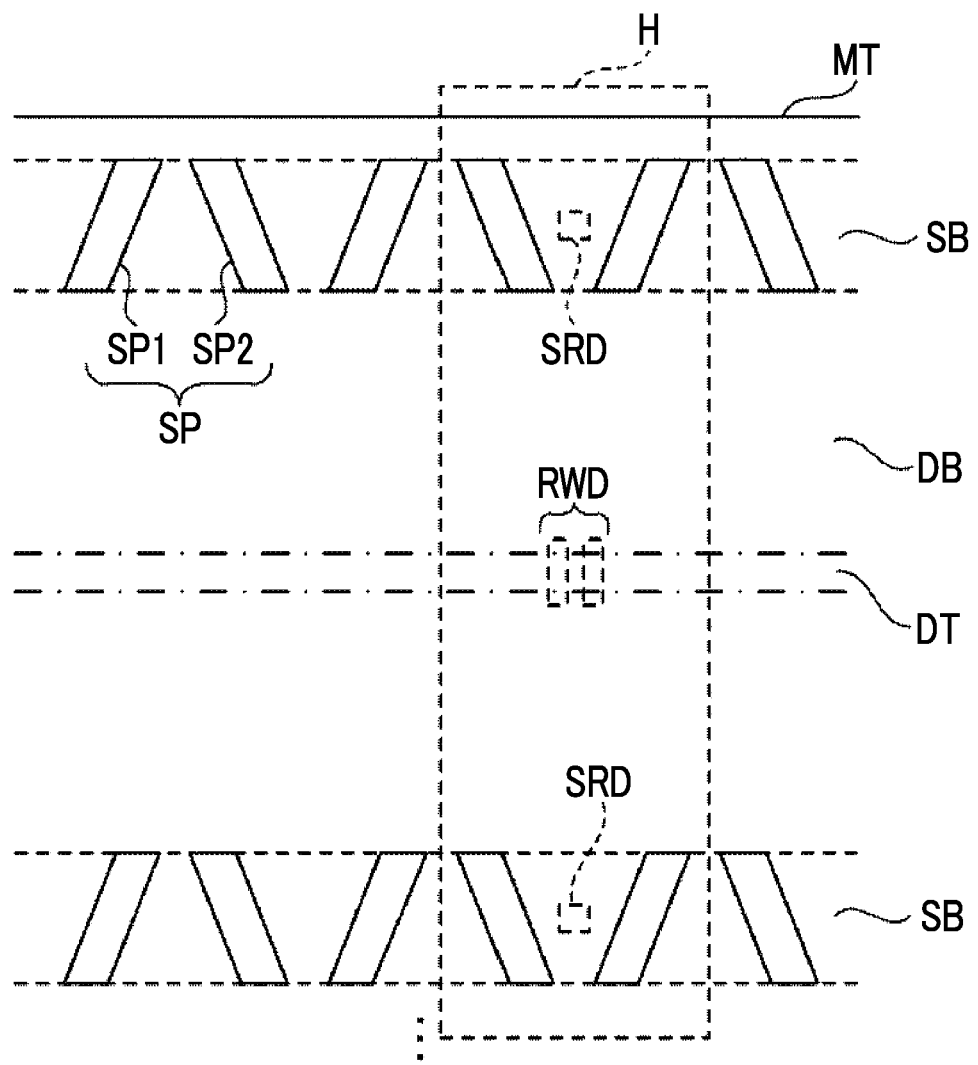
FIG. 3 is a plan view for describing a positioning process of a magnetic head according to the embodiment.

As shown in FIG. 3, the magnetic head H includes a servo reproducing element SRD which reproduces the servo pattern SP recorded on the servo band SB, and a recording and reproducing element RWD which performs recording and reproducing of data with respect to the data track DT. The reproducing here means to read a signal representing the servo pattern SP, data, and the like recorded on the magnetic tape MT. Hereinafter, the position of the magnetic head H, the position of the servo reproducing element SRD, and the position of the recording and reproducing element RWD, which are simply written, respectively mean positions along the tape width direction.

In the embodiment, in a case where the magnetic tape MT runs in a predetermined running direction (for example, right to left direction in FIG. 3), the servo reproducing element SRD of the magnetic head H is positioned at a predetermined position of the servo band SB in the tape width direction, thereby positioning the magnetic head H with respect to the magnetic tape MT. Hereinafter, the running direction simply written means the running direction of the magnetic tape MT.

In a case where the linear pattern SP1 and the linear pattern SP2 pass through a detection position of the servo reproducing element SRD, the servo reproducing element SRD detects the linear pattern SP1 and the linear pattern SP2. In this case, the magnetic head H is positioned at a position so that a detection interval of the linear pattern SP1 and the linear pattern SP2 becomes a predetermined value. Accordingly, the recording and reproducing element RWD of the magnetic head H follows a predetermined data track DT.

Figure 4:
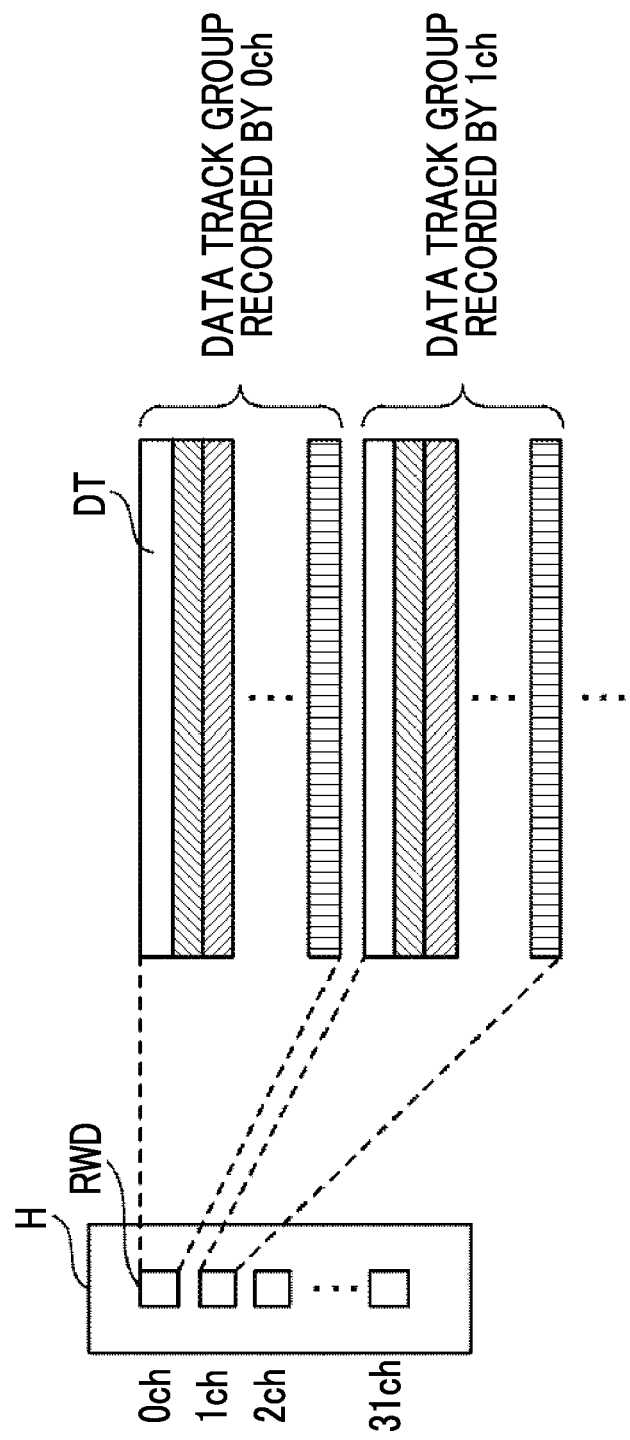
FIG. 4 is a view for describing a process of recording or reproducing data by a recording and reproducing element according to the embodiment.

As shown in FIG. 4, the plurality 32 in the example of FIG. 4) of recording and reproducing elements RWD can be provided and can perform recording and reproducing of data at the same time on the plurality of data tracks DT. Hereinafter, a position of the magnetic head H during performing the recording or reproducing of data on the predetermined data track DT is referred to as a "lapping position".

Next, a configuration of a servo writer SW which records the servo pattern SP on each servo band SB of the magnetic tape MT according to the embodiment will be described with reference to FIGS. 5A and 5B.

Figure 5A:
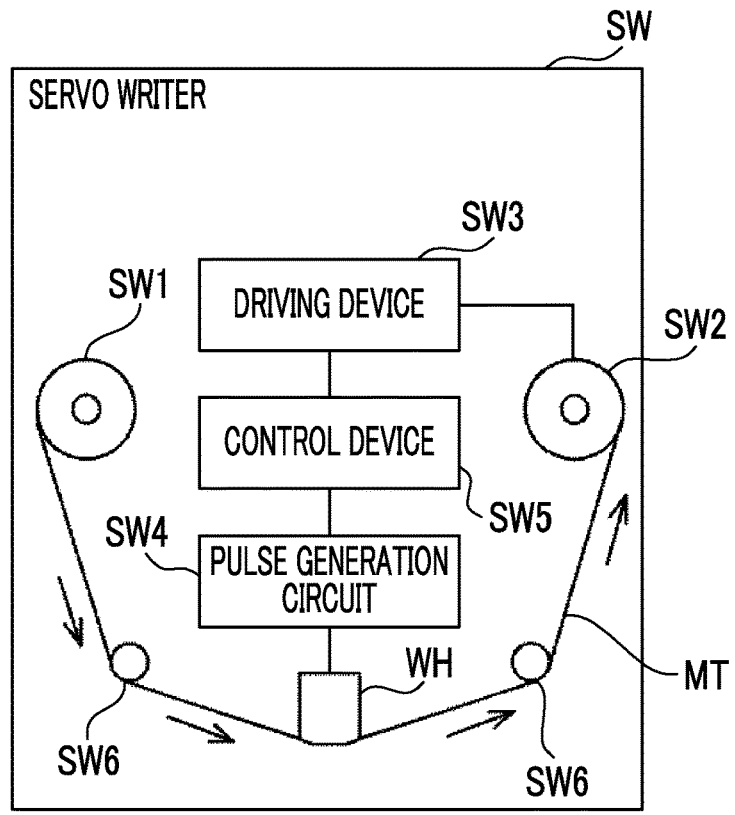
FIG. 5A is a view showing an example of a configuration of a servo writer according to the embodiment.

As shown in FIG. 5A, the servo writer SW includes a sending reel SW1, a winding reel SW2, a driving device SW3, a pulse generation circuit SW4, a control device SW5, and a servo signal writing head WH. In addition, the servo writer SW also includes a power device, a cleaning device which cleans the magnetic tape MT, a verifying device which performs inspection of the servo pattern SP recorded on the magnetic tape MT, and the like which are not shown.

In the sending reel SW1, the magnetic tape MT cut to have a product width from a raw web having a wide width, before writing the servo pattern SP is set on a pancake reel having a great diameter, and the magnetic tape MT is sent at the time of writing the servo pattern SP. The magnetic tape MT sent from the sending reel SW1 is guided to a guide SW6 and the like and transported to the servo signal writing head WH. The magnetic tape MT in which the servo pattern SP is recorded on each servo band SB with the servo signal writing head WH is guided to the guide SW6 and the like and transported to the winding reel SW2. The winding reel SW2 is rotatably driven by a driving device SW3, and the magnetic tape MT on which the servo pattern SP is recorded is wound up.

The driving device SW3 is a device for rotatably driving the winding reel SW2, and includes a motor (not shown), a motor driving circuit for supplying a current to the motor, a gear for connecting a motor axis and the winding reel SW2, and the like. In the driving device SW3, a motor current is generated by the motor driving circuit based on a motor current signal from the control device SW5, this motor current is supplied to the motor, and a rotation driving force of the motor is transmitted to the winding reel SW2 through the gear to rotatably drive the winding reel SW2.

The pulse generation circuit SW4 is a circuit which supplies a recording pulse current to a plurality of coils C (see FIG. 5B) provided in the servo signal writing head WH based on the pulse control signal from the control device SW5, and is independently provided in each of the plurality of coils C. Specifically, the pulse generation circuit SW4 alternately generates a pulse current having positive polarity or negative polarity and a zero current, based on the pulse control signal from the control device SW5, and accordingly, the servo pattern SP is recorded at a predetermined position of each servo band SB. The recording pulse current is a current value sufficient for magnetizing the magnetic layer of the magnetic tape MT by a leakage flux from a gap pattern G (see FIG. 5B), and is set by considering properties of the coil C of the servo signal writing head WH.

Figure 5B:
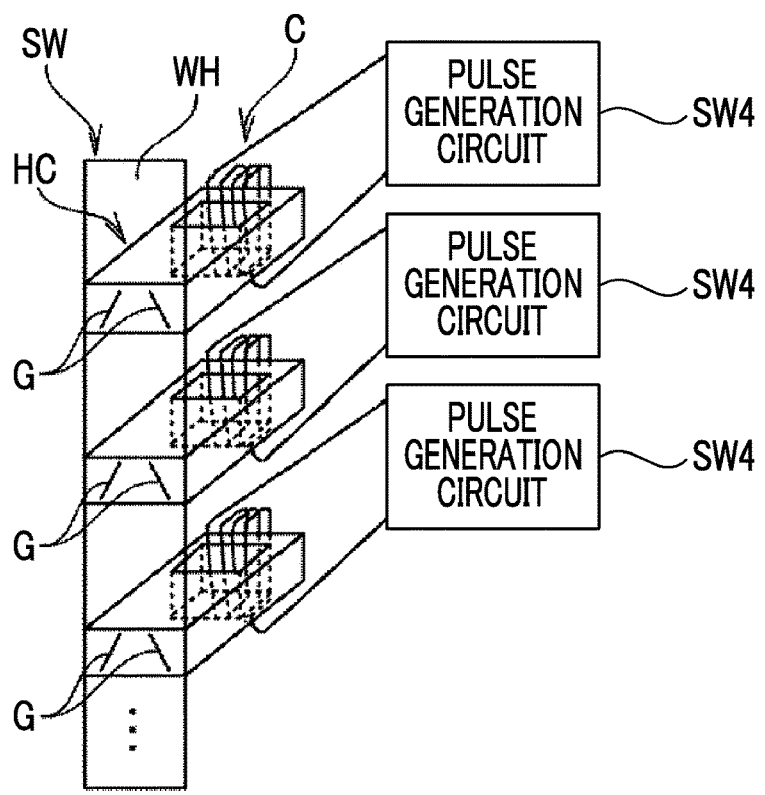
FIG. 5B is a view showing an example of a configuration of a servo writer according to the embodiment.

As shown in FIG. 5B, the servo signal writing head WH includes the linear gap pattern G provided at a position corresponding to each servo band SB, and the servo pattern SP is recorded on the servo band SB of the magnetic tape MT with each gap pattern G One linear pattern of the gap pattern G is tilted according to the angle of the linear pattern SP1, and the other linear pattern is not parallel to the one linear pattern according to the linear pattern SP2. The gap pattern G is an example of a servo recording element which records the servo pattern SP on the servo band SB.

In addition, a head core HC is independent for each gap pattern and each coil C is wound around the head core HC. Each pulse generation circuit SW4 connected to each coil C converts the data for distinguishing each servo band SB encoded in the control device SW5 into a pattern of the recording pulse current, and the recording pulse current is supplied to the coil C according to this pattern. Accordingly, unique identification information corresponding to each servo band SB is embedded in the servo pattern SP of each servo band SB. The head core HC may not be independent for each gap pattern G and, for example, one head core HC may be provided for all of the gap patterns G In this case, the servo pattern SP is collectively recorded on each servo band SB by one recording pulse current.

Figure 6:
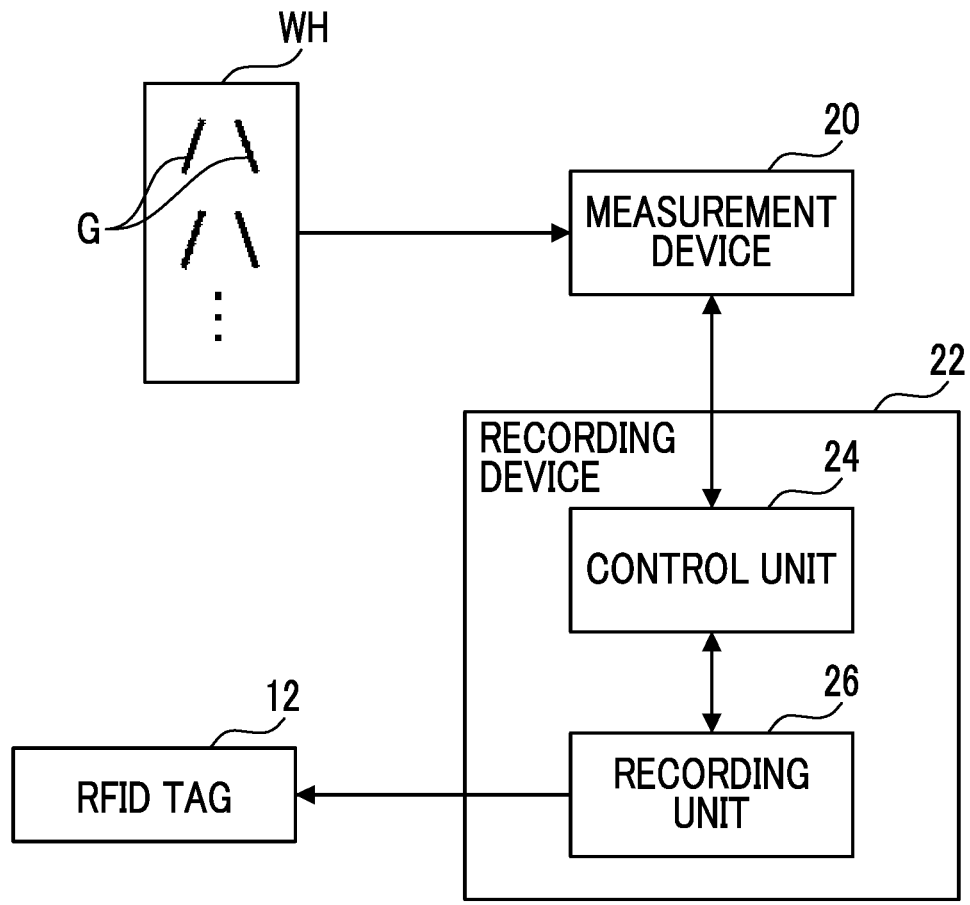
FIG. 6 is a block diagram showing an example of a configuration of a measurement device and a recording device according to the embodiment.

Next, a measurement device 20 and a recording device 22 for recording the servo pattern distance information 14 and the servo band interval information 16 on the RFID tag 12 of the magnetic tape cartridge 10 will be described with reference to FIG. 6. Examples of the measurement device 20 include a magnetic force microscope (MFM), a scanning electron microscope (SEM), and a laser microscope. As shown in FIG. 6, the recording device 22 includes a control unit 24 including a central processing unit (CPU) and a memory as a temporary storage, and a recording unit 26 which records information on the RFID tag 12 in a contactless manner.

The measurement device 20 performs measurement regarding the servo signal writing head WH of the servo writer SW and outputs a signal corresponding to a distance between two linear patterns of each gap pattern G in the tape longitudinal direction. In addition, the measurement device 20 outputs a signal corresponding to an interval between adjacent gap patterns G in the tape width direction.

Figure 7:
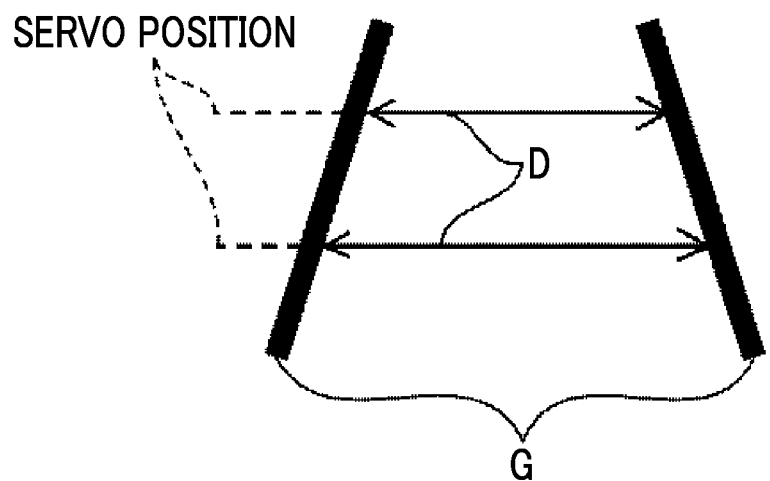
FIG. 7 is a view for describing a distance between linear patterns of a servo pattern according to the embodiment.

The control unit 24 of the recording device 22 acquires a signal output from the measurement device 20. As shown in FIG. 7 as an example, the control unit 24 derives a distance D between two linear patterns of each gap pattern G in the tape longitudinal direction by using the acquired signal. The control unit 24 derives the distance D at each position (hereinafter, referred to as a "servo position") corresponding to the servo pattern SP along the tape width direction. This servo position corresponds to the lapping position described above. The control unit 24 controls the recording unit 26 and records the derived distance D on the RFID tag 12 as the servo pattern distance information 14 by associating with the number and the servo position of the servo band SB corresponding to each gap pattern G.

Figure 8:
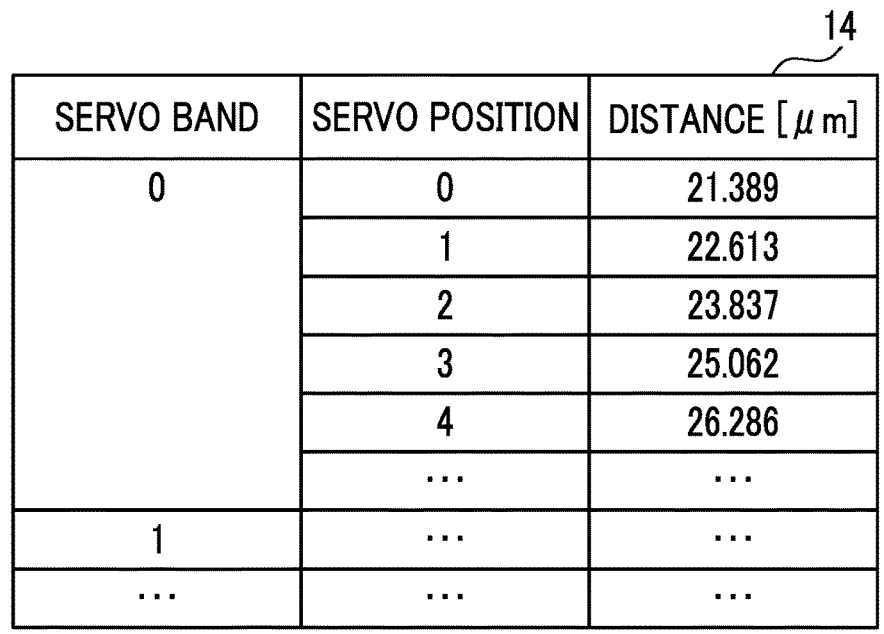
FIG. 8 is a view showing an example of a servo pattern distance information according to the embodiment.

FIG. 8 shows an example of the servo pattern distance information 14. As shown in FIG. 8, the distance D corresponding to each of a combination of the number and the servo position of the servo bands SB is included in the servo pattern distance information 14. The example shown in FIG. 8 shows the distance D at each servo position, in a case where the servo pattern SP, in which an azimuth angle is 12°, a length in the tape width direction is 93 μm, and a distance between the linear pattern SP1 and the linear pattern SP2 at a position of a middle point in the tape width direction (position at 46.5 μm (=93/2)) in the longitudinal direction is 38 μm, is assumed.

From this distance D, which servo position the distance D corresponds to is derived based on Expression (1). The "distance of the middle point" in Expression (1) means a distance between the linear pattern SP1 and the linear pattern SP2 in the tape longitudinal direction at the position of the middle point of the servo pattern SP in the tape width direction (in the example of FIG. 8, 38 μm). That is, in Expression (1), the servo position is derived by the distance in the tape width direction based on the position of the middle point of the servo pattern SP in the tape width direction.

$$\text{Servo position} = \frac{\text{Distance at middle point} - \text{Distance } D}{2 \times \tan \text{Azimuth angle}} \quad (1)$$

Figure 9:
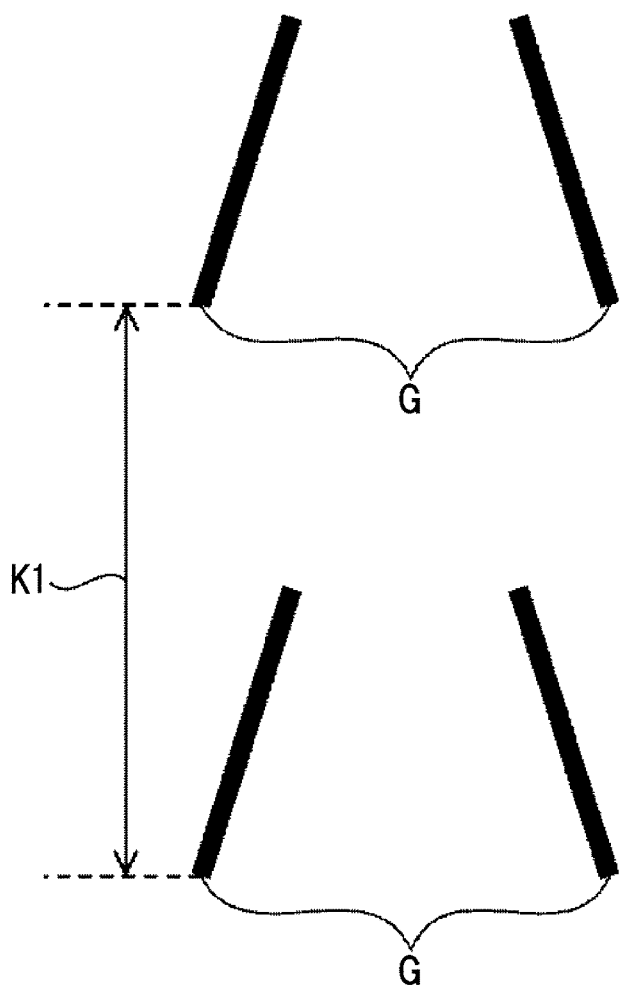
FIG. 9 is a view for describing an interval between adjacent gap patterns according to the embodiment.

As an example shown in FIG. 9, the control unit 24 derives an interval K1 between the adjacent gap patterns G in the tape width direction by using the acquired signal. The control unit 24 controls the recording unit 26 and records the servo band interval information 16 representing the derived interval K1 on the RFID tag 12.

In the embodiment, as shown in FIG. 9, an interval between lower end portions of the gap patterns G is used as the interval K1 of the adjacent gap patterns G in the tape width direction, and there is no limitation thereto. For example, as the interval K1 between the adjacent gap patterns G in the tape width direction, an interval between upper end portions of the gap patterns G may be used, and an interval between centers of the gap patterns G may be used. In addition, for example, as the interval K1 between the adjacent gap patterns G in the tape width direction, a representative value such as an average value or a center value of the intervals between a plurality of positions corresponding to the gap patterns G may be used. As the interval K1 between the adjacent gap patterns G in the tape width direction, a representative value such as an average value or a center value of the intervals between a plurality of sets of the adjacent gap patterns G in the tape width direction may be used, not the interval between a set of the adjacent gap patterns G in the tape width direction.

Next, an example of a flow of a servo recording process of recording the servo pattern SP on the magnetic tape MT of the magnetic tape cartridge 10 and recording the servo pattern distance information 14 and the servo band interval information 16 on the RFID tag 12 will be described with reference to FIG. 10.

Figure 10:
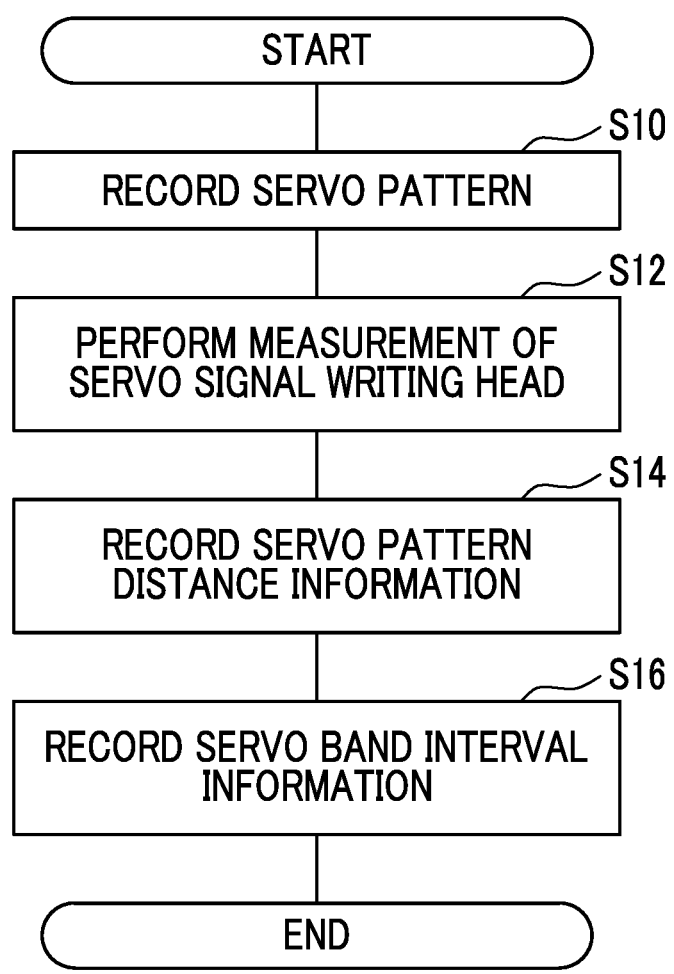
FIG. 10 is a flowchart showing an example of a servo recording process according to the embodiment.

In Step S10 of FIG. 10, as described above, the servo writer SW records the servo pattern SP by the gap pattern G corresponding to the servo signal writing head WH on each servo band SB of the magnetic tape MT, by the control of the control device SW5.

In Step S12, as described above, the measurement device 20 performs measurement regarding the servo signal writing head WH of the servo writer SW used in the process of Step S10 and outputs a signal of the measurement result. In Step S14, as described above, the control unit 24 of the recording device 22 derives the distance D by using the signal output by the process of Step S12. The control unit 24 controls the recording unit 26 and records the derived distance D on the RFID tag 12 as the servo pattern distance information 14 by associating with the number and the servo position of the servo band SB corresponding to each gap pattern G.

In Step S16, as described above, the control unit 24 of the recording device 22 derives the interval K1 by using the signal output in the process of Step S12. The control unit 24 controls the recording unit 26 and records the servo band interval information 16 representing the derived interval K1 on the RFID tag 12. In a case where the process of Step S16 ends, this servo recording process ends.

The process procedure of this servo recording process is not limited to the example shown in FIG. 10. For example, after performing the process from Step S12 to Step S16, the process of Step S10 may be performed. The servo pattern SP is recorded on the servo band SB by the process described above and the magnetic tape cartridge 10 in which the servo pattern distance information 14 and the servo band interval information 16 are recorded on the RFID tag 12 is shipped.

Next, a configuration of a recording and reproducing system 30 which performs recording and reproducing of data with respect to the shipped magnetic tape cartridge 10 will be described with reference to FIG. 11.

Figure 11:
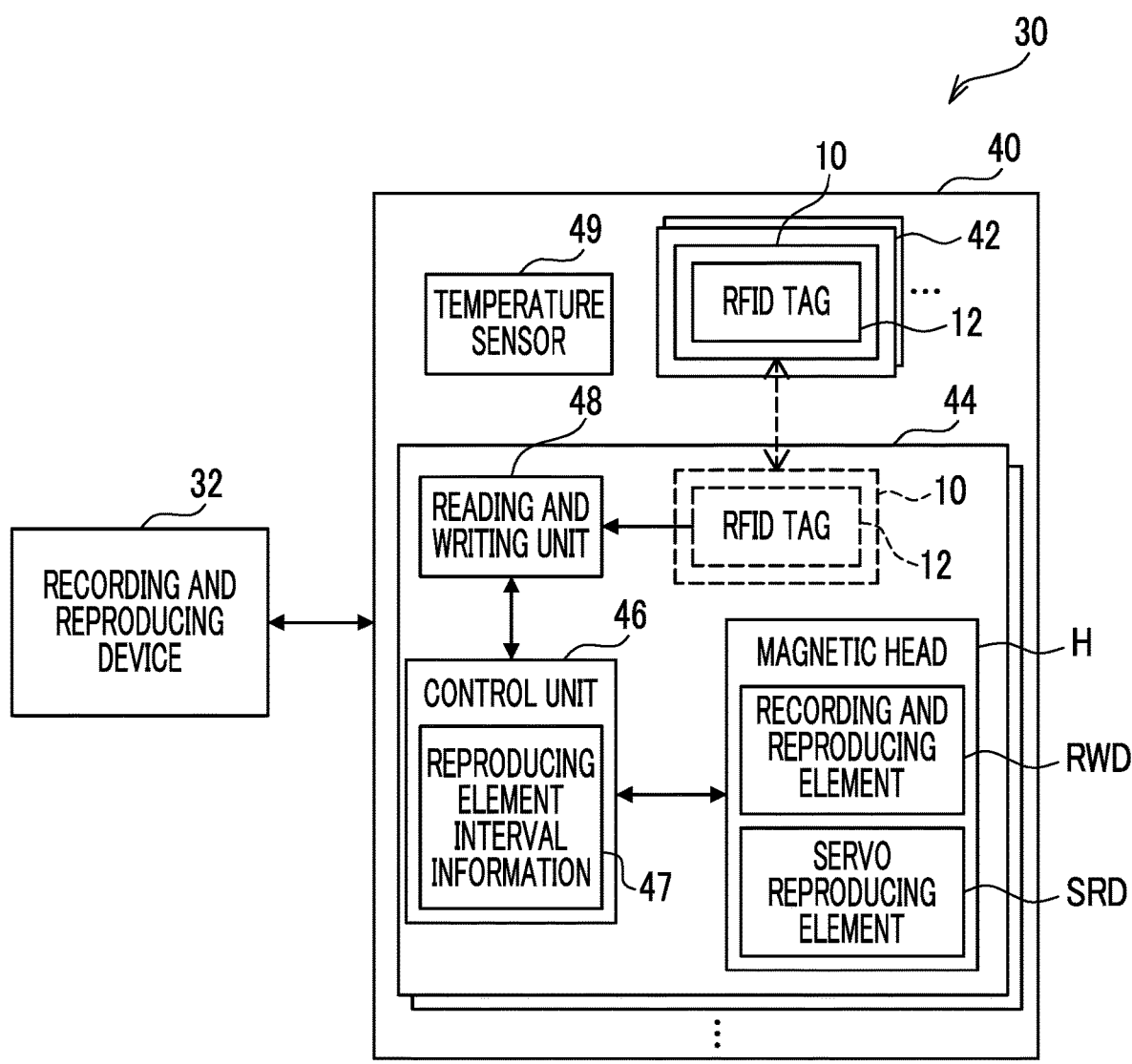
FIG. 11 is a block diagram showing an example of a configuration of a recording and reproducing system according to the embodiment.

As shown in FIG. 11, the recording and reproducing system 30 includes a recording and reproducing device 32 and a tape library 40. The tape library 40 includes a plurality of slots 42, a plurality of tape drives 44, and a temperature sensor 49. The temperature sensor 49 measures an environment temperature in the tape library 40.

The magnetic tape cartridge 10 is stored in the slot 42. In the tape drive 44, the magnetic tape cartridge 10 extracted from the slot 42 is loaded. In addition, after completing the recording or reproducing of the data with respect to the magnetic tape MT of the magnetic tape cartridge 10 loaded in the tape drive 44, the magnetic tape cartridge 10 is unloaded from the tape drive 44 and stored in the slot 42.

Figure 12:
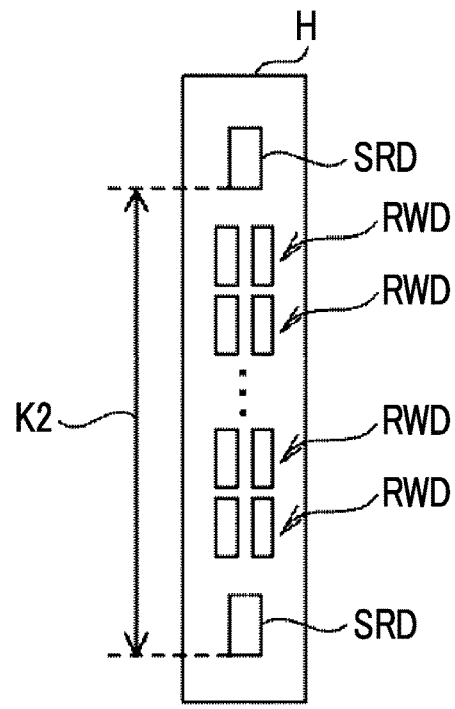
FIG. 12 is a view showing an example of a configuration of a magnetic head according to the embodiment.

The tape drive 44 includes a control unit 46, a reading and writing unit 48, and the magnetic head H. As shown in FIG. 12, the magnetic head H includes the plurality of recording and reproducing elements RWD, and the plurality (in the embodiment, two) of servo reproducing elements SRD corresponding to each of the adjacent servo bands SB.

The reading and writing unit 48 reads the information recorded on the RFID tag 12 embedded in the magnetic tape cartridge 10 in a contactless manner and outputs the read information to the control unit 46, by the control of the control unit 46. The reading and writing unit 48 records information on the RFID tag 12 in a contactless manner by the control of the control unit 46. As an example of the reading and writing unit 48, an RFID reader and writer is used.

The control unit 46 includes a programmable logic device (PLD), a memory as a temporary storage, and a non-volatile storage unit. The storage unit included in the control unit 46 stores a reproducing element interval information 47. As an example shown in FIG. 12, the reproducing element interval information 47 is information representing an interval K2 in the tape width direction between the servo reproducing elements SRD reading each of the adjacent servo patterns SP along the tape width direction. The interval K2 is measured by a measurement device such as a MFM, an SEM, and a laser microscope, in a manufacturing step of the tape drive 44. The tape drive 44 in which the reproducing element interval information 47 representing the interval K2 measured by the measurement device is stored in the storage unit is shipped.

In the embodiment, as shown in FIG. 12, as the interval K2, an interval between lower end portions of the servo reproducing elements SRD is used, but there is no limitation thereto. For example, as the interval K2, an interval between upper end portions of the servo reproducing elements SRD may be used, or an interval between centers of the servo reproducing elements SRD may be used. In addition, for example, as the interval K2, a representative value such as an average value or a center value of the intervals between a plurality of positions corresponding to the servo reproducing elements SRD may be used.

Figure 13:
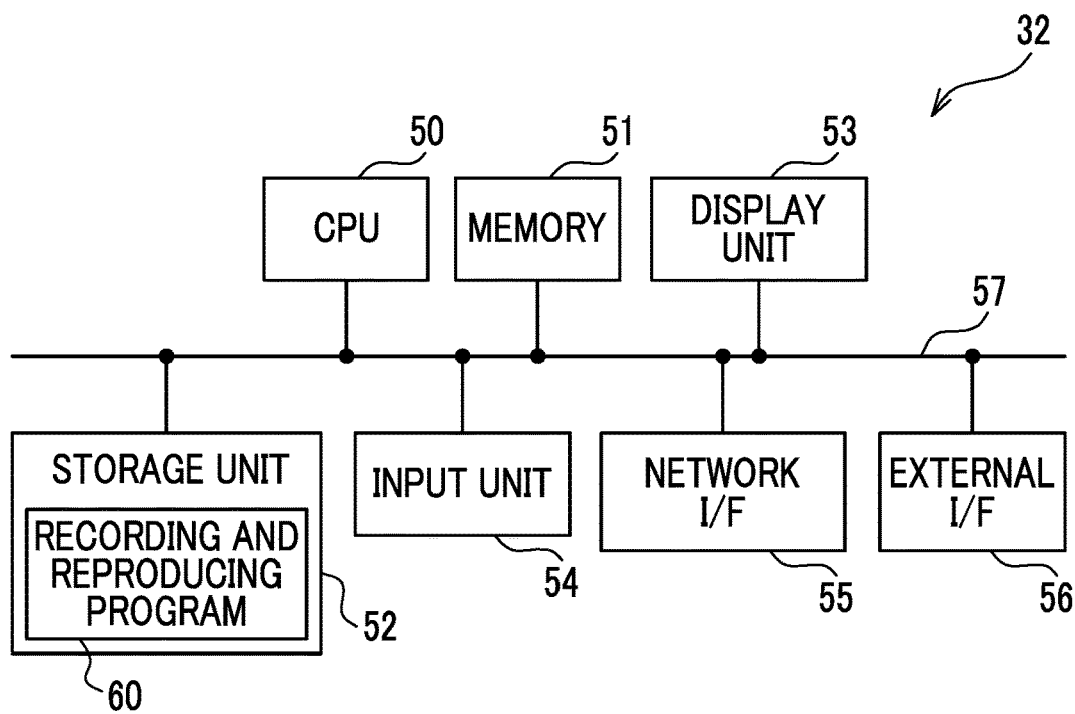
FIG. 13 is a block diagram showing an example of a hardware configuration of a recording and reproducing device according to the embodiment.

Next, a hardware configuration of the recording and reproducing device 32 according to the embodiment will be described with reference to FIG. 13. As shown in FIG. 13, the recording and reproducing device 32 includes a CPU 50, a memory 51 as a temporary storage, and a non-volatile storage unit 52. In addition, the recording and reproducing device 32 includes a display unit 53 such as a liquid crystal display, an input unit 54 such as a keyboard and a mouse, a network interface (I/F) 55 connected to the network, and an external I/F 56 connected to the tape library 40. The CPU 50, the memory 51, the storage unit 52, the display unit 53, the input unit 54, the network I/F 55, and the external I/F 56 are connected to each other through a bus 57. Examples of the recording and reproducing device 32 include a personal computer and a server computer.

The storage unit 52 is realized with a hard disk drive (HDD), a solid state drive (SSD), and a flash memory. The storage unit 52 as a storage medium stores a recording and reproducing program 60. The CPU 50 reads the recording and reproducing program 60 from the storage unit 52, develops the recording and reproducing program to the memory 51, and executes the developed recording and reproducing program 60.

Figure 14:
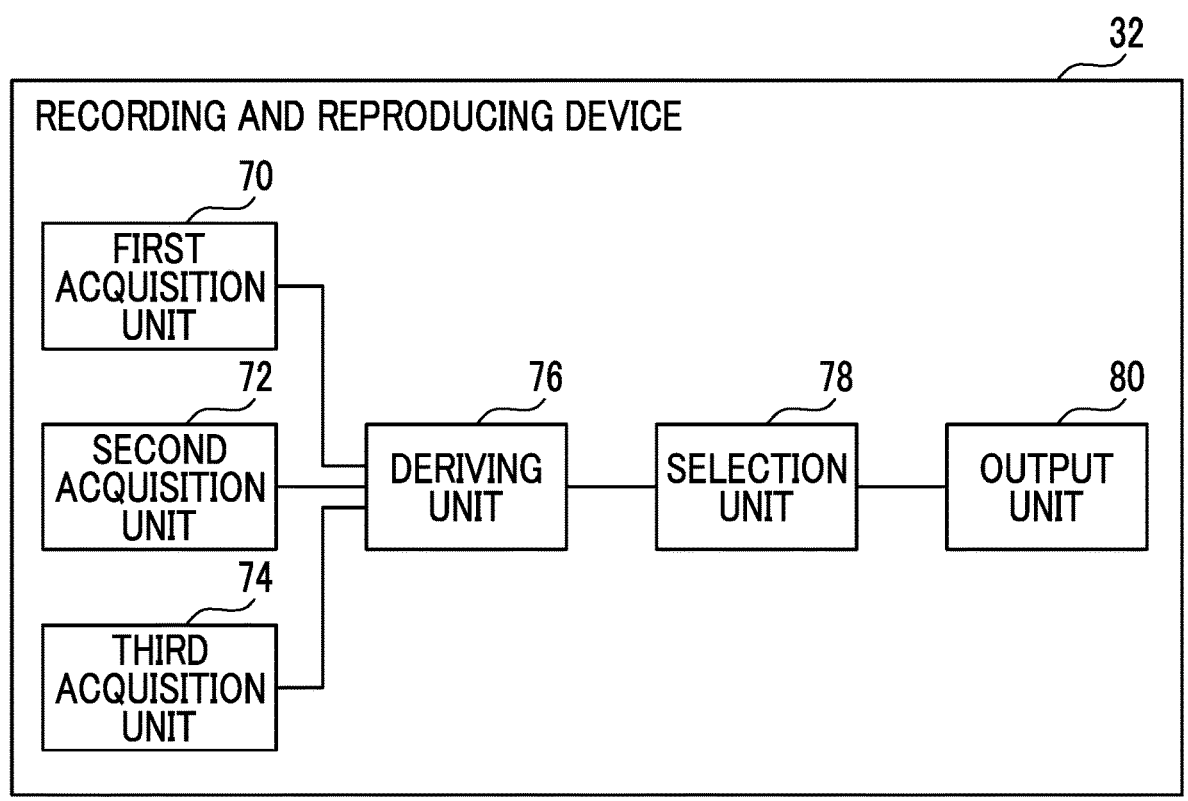
FIG. 14 is a block diagram showing an example of a functional configuration of the recording and reproducing device according to the embodiment.

Next, a functional configuration of the recording and reproducing device 32 according to the embodiment will be described with reference to FIG. 14. As shown in FIG. 14, the recording and reproducing device 32 includes a first acquisition unit 70, a second acquisition unit 72, a third acquisition unit 74, a deriving unit 76, a selection unit 78, and an output unit 80. By executing the recording and reproducing program 60 by the CPU 50, the recording and reproducing device functions as the first acquisition unit 70, the second acquisition unit 72, the third acquisition unit 74, the deriving unit 76, the selection unit 78, and the output unit 80.

The first acquisition unit 70 acquires the servo band interval information 16 stored in the RFID tag 12 of the magnetic tape cartridge 10 which is a target of the recording or reproducing. For example, the first acquisition unit 70 acquires the servo band interval information 16 read from the RFID tag 12 of the magnetic tape cartridge 10 by the RFID reader attached to an arm which extracts the magnetic tape cartridge 10 from the slot 42. The magnetic tape cartridge 10 which is a target of the recording or reproducing is inserted into any tape drive 44, and the first acquisition unit 70 may acquire the servo band interval information 16 which is read from the RFID tag 12 of the magnetic tape cartridge 10 by the reading and writing unit 48 of the tape drive 44 which is the insertion destination.

In addition, for example, the first acquisition unit 70 may acquire the servo band interval information 16 stored to be associated with identification information of the magnetic tape cartridge 10 in the storage unit 52 from the storage unit 52. In this case, an aspect in which the recording and reproducing device 32 acquires the servo band interval information 16 stored in the RFID tag 12 of each magnetic tape cartridge 10, in a case where the magnetic tape cartridge 10 is initially stored in the tape library 40 is used. In this case, the recording and reproducing device 32 stores the acquired servo band interval information 16 in the storage unit 52 to be associated with the identification information of the magnetic tape cartridge 10, respectively.

The second acquisition unit 72 acquires the reproducing element interval information 47 stored in the storage unit included in each tape drive 44. The second acquisition unit 72 may acquire the reproducing element interval information 47 sent by the tape drive 44, in a case where the tape drive 44 is mounted on the tape library 40. In this case, the recording and reproducing device 32 stores the identification information of the tape drive 44 and the reproducing element interval information 47 in the storage unit 52 to be associated with each other.

The third acquisition unit 74 acquires an environment temperature in the tape library 40 measured by the temperature sensor 49.

The deriving unit 76 derives a value representing a difference between the interval K1 represented by the servo band interval information 16 acquired by the first acquisition unit 70 and the interval K2 represented by the reproducing element interval information 47 acquired by the second acquisition unit 72, regarding each tape drive 44. In the embodiment, the deriving unit 76 derives an absolute value of a difference between the interval K1, and a value obtained by multiplying a coefficient C1 which increases as the environment temperature acquired by the third acquisition unit 74 increases, by the interval K2, according to Expression (2), as a value DF representing a difference between the interval K1 and the interval K2. As an example of the coefficient C1, a value obtained by multiplying a coefficient of thermal expansion corresponding to a material of the servo reproducing element SRD, by a difference between the environment temperature acquired by the third acquisition unit 74 and a reference temperature. For example, in a case where Altic is used as the material of the servo reproducing element SRD, 7.6 ppm/degree can be used as the coefficient of thermal expansion.

$$DF = |K1 - K2 \times C1| \qquad (2)$$

The value DF representing the difference is not limited, as long as it is a value representing a difference between the interval K1 and the interval K2, and may be a ratio of the interval K1 and the interval K2, for example.

The deriving unit 76 may derives the value DF representing the difference between the interval K1 and the interval K2, without using the coefficient C1. In this case, the temperature sensor 49 is not necessary.

The selection unit 78 selects the tape drive 44, to which the magnetic tape cartridge 10 is inserted, from a plurality of tape drives 44 by using the value DF representing the difference between the interval K1 and the interval K2 derived by the deriving unit 76. In the embodiment, the selection unit 78 selects the tape drive 44 having the minimum value DF representing the difference, from the plurality of tape drives 44.

The output unit 80 outputs the information representing the tape drive 44 selected by the selection unit 78 to the tape library 40.

Next, a flow of a data recording process of recording data on the magnetic tape cartridge 10 performed by the recording and reproducing system 30 will be described with reference to FIG. 15. The data recording process shown in FIG. 15 is, for example, performed in a case where a recording instruction is input through the input unit 54, for example.

Figure 15:
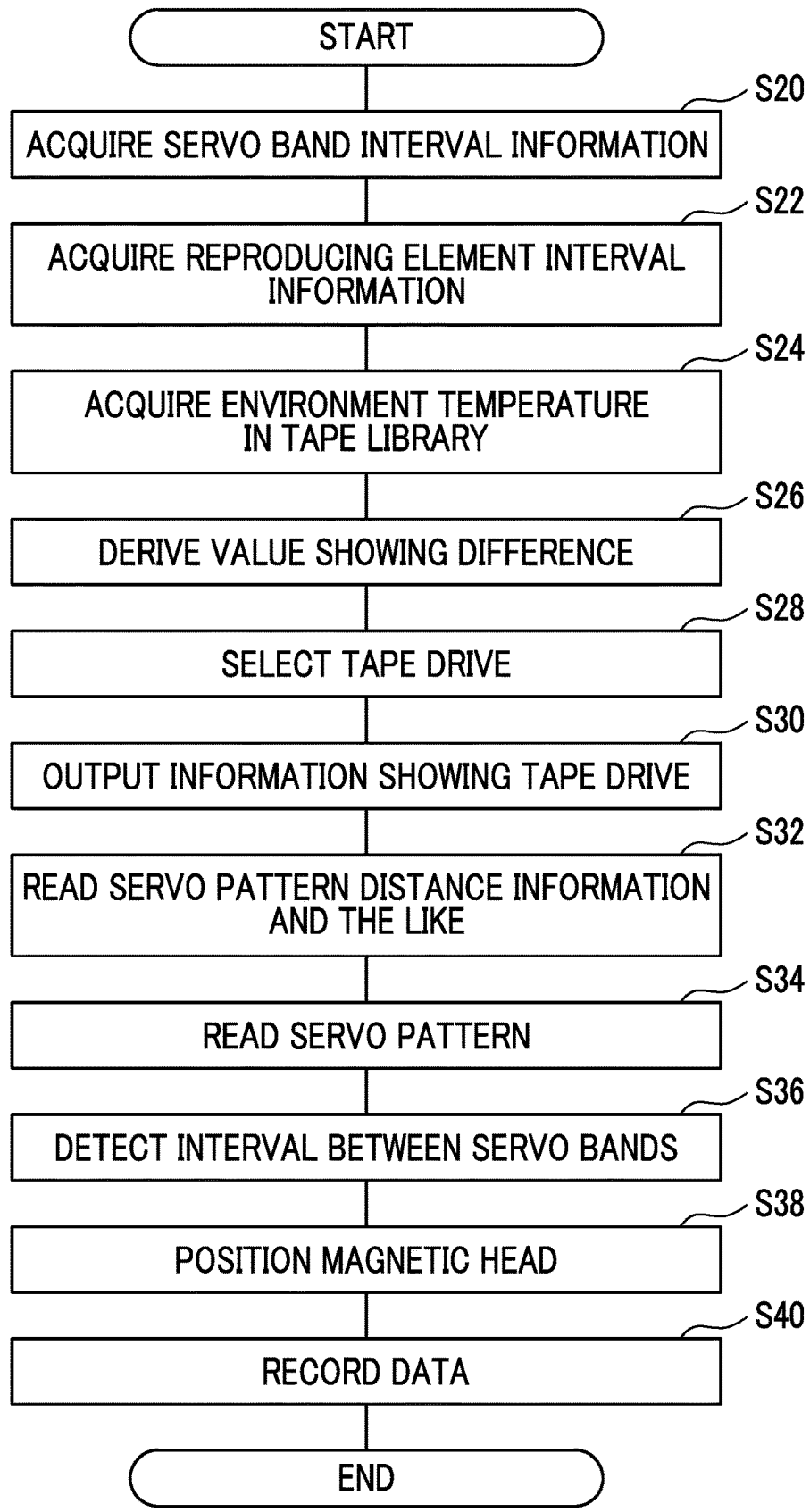
FIG. 15 is a flowchart showing an example of a data recording process according to the embodiment.

In Step S20 of FIG. 15, the first acquisition unit 70 acquires the servo band interval information 16 stored in the RFID tag 12 of the magnetic tape cartridge 10 which is a recording target, as described above. In Step S22, the second acquisition unit 72 acquires the reproducing element interval information 47 stored in the storage unit included in each tape drive 44. In Step S24, the third acquisition unit 74 acquires the environment temperature in the tape library 40 measured by the temperature sensor 49.

In Step S26, as described above, the deriving unit 76 derives the value DF representing a difference between the interval K1 represented by the servo band interval information 16 acquired in Step S20 and the interval K2 represented by the reproducing element interval information 47 acquired in Step S22, according to Expression (2), regarding each tape drive 44. The C1 in Expression (2) is a coefficient which increases, as the environment temperature acquired in Step S24 increases.

In Step S28, the selection unit 78 selects the tape drive 44 having the smallest value DF representing the difference derived in Step S26, from the plurality of tape drives 44. In Step S30, the output unit 80 outputs the information representing the tape drive 44 selected in Step S28 to the tape library 40.

In a case where the process of Step S30 ends, the magnetic tape cartridge 10 which is a recording target is inserted into the tape drive 44 selected in Step S28, and processes of Step S32 to S40 are performed by the control unit 46 of the tape drive 44.

In Step S32, the control unit 46 controls the reading and writing unit 48 and reads the servo pattern distance information 14 and the servo band interval information 16 recorded on the RFID tag 12. The control unit 46 acquires the servo pattern distance information 14 and the servo band interval information 16 read by the reading and writing unit 48. In Step S34, the control unit 46 controls the magnetic head H and reads the predetermined number of servo patterns SP recorded on the servo band SB by the servo reproducing element SRD. In this case, the control unit 46 controls a transportation mechanism of pulling the magnetic tape MT so that a tension of the magnetic tape MT becomes regulated tension (for example, 0.55 [N]).

In Step S36, the control unit 46 detects an interval between the adjacent servo bands SB in the tape width direction based on the reading result in Step S34. Hereinafter, this interval is referred to as an "interval K3". Specifically, the control unit 46 converts a time interval of timings at which the linear pattern SP1 and the linear pattern SP2 are read by each servo reproducing element SRD into a distance between the linear pattern SP1 and the linear pattern SP2 in the tape longitudinal direction. The control unit 46 derives the servo position of each servo reproducing element SRD based on Expression (1) by using the distance obtained by the conversion. The control unit 46 detects the interval K3 by adding a difference between the derived servo positions of the servo reproducing elements SRD to the interval K2 between the servo reproducing elements SRD in the tape width direction represented by the reproducing element interval information 47.

In Step S38, the control unit 46 performs the positioning of the magnetic head H based on the time interval of the timings at which the linear pattern SP1 and the linear pattern SP2 are read in the process of Step S34, and the servo pattern distance information 14 acquired in the process of Step S32.

In Step S40, the control unit 46 controls the magnetic head H positioned by the process in Step S38 and records data on the data band DB. In this case, the control unit 46 controls a tension of the magnetic tape MT so that the interval K3 detected in Step S36 becomes equal to the interval K2. For example, the control unit 46 set the tension of the magnetic tape MT to be greater than the regulated tension, in a case where the interval K3 is longer than the interval K2, and sets the tension of the magnetic tape MT to be smaller than the regulated tension, in a case where the interval K3 is shorter than the interval K2. In a case where the process of Step S40 ends, the magnetic tape cartridge 10 is unloaded from the tape drive 44, and the unloaded magnetic tape cartridge 10 is stored in the slot 42. In a case where the process of Step S40 ends, the data recording process ends.

The reading process of the data recorded on the magnetic tape cartridge 10 can also be performed in the same manner as in the recording process shown in FIG. 15.

As described above, in the embodiment, the tape drive 44 having the minimum value DF representing the difference between the interval K1 represented by the servo band interval information 16 and the interval K2 represented by the reproducing element interval information 47 is selected from the plurality of tape drives 44. Therefore, it is possible to perform the positioning of the magnetic head H with excellent accuracy.

Figure 16:
FIG. 16 is a view showing an example of ideal servo patterns and actual servo patterns.
Figure 16:
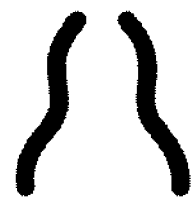
Figure 16:
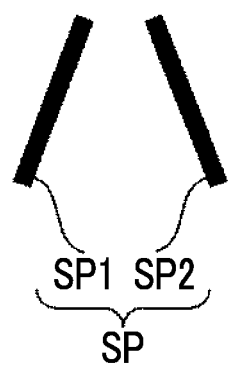
Figure 16:
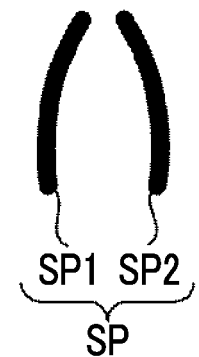

As an example shown in FIG. 16, it is ideal for the servo patterns SP to be linearly recorded, but in practice, the servo patterns are curved, in many cases. In contrast, in the embodiment, the positioning of the magnetic head H is performed using the servo pattern distance information 14 obtained by measuring the gap pattern G of which the servo pattern SP is actually formed in the magnetic tape MT, by considering the curved servo pattern SP. Therefore, it is possible to perform the positioning of the magnetic head H with excellent accuracy.

In the embodiment, the case of selecting the tape drive 44 having the minimum value DF representing the difference has been described, but there is no limitation thereto. For example, any one of tape drives 44 having the value DF representing the difference equal to or smaller than a threshold value may be selected. As a threshold value in this case, for example, 0.1 μm can be used. In this case, in a case where the tape drive 44 having the value DF representing the difference of 0.1 μm does not exist or is in use, any one of tape drive 44 in which the value DF representing the difference is greater than 0.1 μm and equal to or smaller than 0.2 μm may be selected. In addition, for example, the selectable tape drives 44 may be specified, and the tape drive 44 having the minimum value DF showing the difference may be selected from the specified tape drives 44.

In the embodiment, the case of measuring the environment temperature at one portion in the tape library 40 has been described, but there is no limitation thereto. For example, the temperature sensors 49 may be provided on the periphery of the tape drives 44 in the tape library 40 one by one, and the environment temperature of each of the tape drive 44 may be measured. In this case, as C1 in Expression (2), the coefficient which increases, as the environment temperature increases, is used for each of the tape drive 44.

In the embodiment, the case of recording the servo band interval information 16 on the RFID tag 12 has been described, and there is no limitation thereto. For example, the servo band interval information 16 may be repeatedly recorded on a top portion or over the entire length of the data band DB or the servo band SB. In addition, the servo band interval information 16 may be recorded on a barcode recorded at a predetermined position of an outer peripheral surface of the magnetic tape cartridge 10. Further, the servo band interval information 16 may be recorded on a two-dimensional code such as a QR code (registered trademark) recorded at a predetermined position of an outer peripheral surface of the magnetic tape cartridge 10.

In the embodiment, the servo band interval information 16 may be recorded on a database of the outside. In this case, for example, identification information such as a manufacturing number of the magnetic tape cartridge 10 may be recorded on the RFID tag 12, the barcode, or the two-dimensional code, and the servo band interval information 16 may be recorded on the database to be associated with the identification information of the magnetic tape cartridge 10.

In the embodiment, for example, various processors shown below can be used as hardware structure of the processing unit executing various processes such as the first acquisition unit 70, the second acquisition unit 72, the third acquisition unit 74, the deriving unit 76, the selection unit 78, and the output unit 80. As described above, the various processors include a programmable logic device (PLD) which is a processor capable of converting a circuit configuration after manufacturing FPGA or the like, and an exclusive electric circuit which is a processor having a circuit configuration exclusively designed for executing specific processes such as application specific integrated circuit (ASIC) or the like, in addition to a CPU which is a general-purpose processor which functions as various processing units by executing software (program).

One processing unit may be configured with one of these various processors, or may be configured with a combination of two or more processors of the same type or different type (for example, a combination of a plurality of FPGAs, or a combination of a CPU and an FPGA). In addition, the plurality of processing units may be configured with one processor. As an example of configuring the plurality of processing units with one processor, first, one processor is configured with a combination of one or more CPUs and software, as represented by the computer of a client and a server, and this processor functions as a plurality of processing units. Second, the processor executing the function of the entire system including the plurality of processing units with one integrated circuit (IC) chip, as represented by a system on chip (SoC), is used. As described above, various processing units are configured using one or more various processors as hardware configuration.

In addition, as the hardware configuration of these various processors, more specifically, an electric circuit (circuitry) with a combination of circuit elements such as a semiconductor element can be used.

In the embodiment, the aspect in which the recording and reproducing program 60 is stored (installed) in the storage unit 52 in advance has been described, but there is no limitation thereto. The recording and reproducing program 60 may be provided in the aspect of being recorded on a recording medium such as a Compact Disc Read Only Memory (CD-ROM), a Digital Versatile Disc Read Only Memory (DVD-ROM), and a Universal Serial Bus (USB) memory. In addition, the recording and reproducing program 60 may be downloaded from an external device through network.

What is claimed is:

1. A recording and reproducing device that selects a tape drive into which a magnetic tape is inserted, from a plurality of drives, the magnetic tape including a plurality of servo bands, on which servo patterns are recorded, and data bands which are provided between the servo bands and on which data is recorded, the device comprising:
    a first acquisition unit which acquires servo band interval information representing an interval, in a width direction of the magnetic tape, between adjacent servo recording elements of a plurality of servo recording elements which record the servo patterns on the plurality of servo bands, respectively;
    a second acquisition unit which acquires reproducing element interval information representing an interval in the width direction between respective servo reproducing elements which read the adjacent servo patterns along the width direction with respect to the plurality of tape drives; and
    a selection unit which selects a tape drive into which the magnetic tape is inserted, from the plurality of tape drives, using a value representing a difference between the interval represented by the servo band interval information and the interval represented by the reproducing element interval information.

2. The recording and reproducing device according to claim 1,
    wherein the selection unit selects a tape drive having a minimum value of representing the difference, from the plurality of tape drives.

3. The recording and reproducing device according to claim 1, further comprising:
    a third acquisition unit which acquires an environment temperature in a tape library having the plurality of embedded tape drives,
    wherein the value representing the difference is a value representing the difference between the interval represented by the servo band interval information, and a value obtained by multiplying a coefficient which increasing as the environment temperature increases, by the interval represented by the reproducing element interval information.

4. The recording and reproducing device according to claim 1,
    wherein the second acquisition unit acquires the reproducing element interval information stored in a storage unit included in the tape drive.

5. The recording and reproducing device according to claim 1,
wherein the second acquisition unit acquires the reproducing element interval information sent by the tape drive, in a case where the tape drive is mounted in the tape library.

6. A recording and reproducing method of a magnetic tape including a plurality of servo bands, on which servo patterns are recorded, and data bands which are provided between the servo bands and on which data is recorded, the method comprising:
acquiring servo band interval information representing an interval, in a width direction of the magnetic tape, between adjacent servo recording elements of a plurality of servo recording elements which record the servo patterns on the plurality of servo bands, respectively;
acquiring reproducing element interval information representing an interval in the width direction between respective servo reproducing elements which read the adjacent servo patterns along the width direction with respect to the plurality of tape drives; and
selecting, from a plurality of tape drives of a recording and reproducing device, a tape drive into which the magnetic tape is inserted, using a value representing a difference between the interval represented by the servo band interval information and the interval represented by the reproducing element interval information.

7. A non-transitory storage medium storing a program that causes a computer to execute a recording and reproducing processing of a magnetic tape including a plurality of servo bands, on which servo patterns are recorded, and data bands which are provided between the servo bands and on which data is recorded, the recording and reproducing processing comprising:
acquiring servo band interval information representing an interval, in a width direction of the magnetic tape, between adjacent servo recording elements of a plurality of servo recording elements which record the servo patterns on the plurality of servo bands, respectively;
acquiring reproducing element interval information representing an interval in the width direction between respective servo reproducing elements which read the adjacent servo patterns along the width direction with respect to the plurality of tape drives; and
selecting, from a plurality of tape drives of a recording and reproducing device, a tape drive into which the magnetic tape is inserted, using a value representing a difference between the interval represented by the servo band interval information and the interval represented by the reproducing element interval information.

* * * * *